United States Patent
Rolin et al.

(10) Patent No.: US 8,156,254 B2
(45) Date of Patent: Apr. 10, 2012

(54) DATA EXCHANGE BETWEEN AN ELECTRONIC PAYMENT TERMINAL AND A MAINTENANCE TOOL THROUGH A USB LINK

(75) Inventors: Christian Rolin, Guilherand-Granges (FR); Dominique Testu, Saint Peray (FR)

(73) Assignee: Ingenico France, Neuilly sur Seine (FR)

( * ) Notice: Subject to any disclaimer, the term of this patent is extended or adjusted under 35 U.S.C. 154(b) by 0 days.

(21) Appl. No.: 12/682,708

(22) PCT Filed: Oct. 9, 2008

(86) PCT No.: PCT/FR2008/051836
§ 371 (c)(1),
(2), (4) Date: Jun. 3, 2010

(87) PCT Pub. No.: WO2009/053626
PCT Pub. Date: Apr. 30, 2009

(65) Prior Publication Data
US 2010/0262723 A1    Oct. 14, 2010

(30) Foreign Application Priority Data
Oct. 12, 2007  (FR) ...................... 07 58250

(51) Int. Cl.
*G06F 3/00* (2006.01)
*G06F 13/12* (2006.01)
(52) U.S. Cl. .................. 710/8; 710/14; 710/62

(58) Field of Classification Search ................ 710/8, 14, 710/62
See application file for complete search history.

(56) References Cited

U.S. PATENT DOCUMENTS

| | | | |
|---|---|---|---|
| 2002/0169915 A1* | 11/2002 | Wu | 710/305 |
| 2004/0041021 A1 | 3/2004 | Nugent, Jr. | |
| 2004/0083400 A1* | 4/2004 | Saito et al. | 713/500 |
| 2005/0010699 A1* | 1/2005 | Hung et al. | 710/14 |

OTHER PUBLICATIONS

International Search Report; International Application No. PCT/FR2008/051836; Apr. 24, 2009.
Pull-up/pull-down resistors—Universal Serial Bus Specification Revision 2.0; USB Engineering Change Notice; May 23, 2003.
Choate, Jim; USB 2.0 Electrical Overview passage; USB 2.0 Electrical Overview; Jun. 11, 2002.
Compaq, Hewlett-Packard, Intel, Lucent, Microsoft, NEC, Phillips; Universal Serial Bus Specification; Revision 2.0; Apr. 27, 2000.
Written Opinion issued in PCT/FR2008/051836.

* cited by examiner

*Primary Examiner* — Chun-Kuan Lee
*Assistant Examiner* — David Martinez
(74) *Attorney, Agent, or Firm* — Vedder Price PC

(57) ABSTRACT

The invention relates to an electronic payment terminal (30) comprising a first USB connection port (13) comprising at least one first wire (D+") for data transfer. The payment terminal comprises, furthermore, a first resistor (24) linking the first wire to a first source (VDD) of a first potential and a switch (38) between the first wire and the first resistor or between the first resistor and the first source.

7 Claims, 1 Drawing Sheet

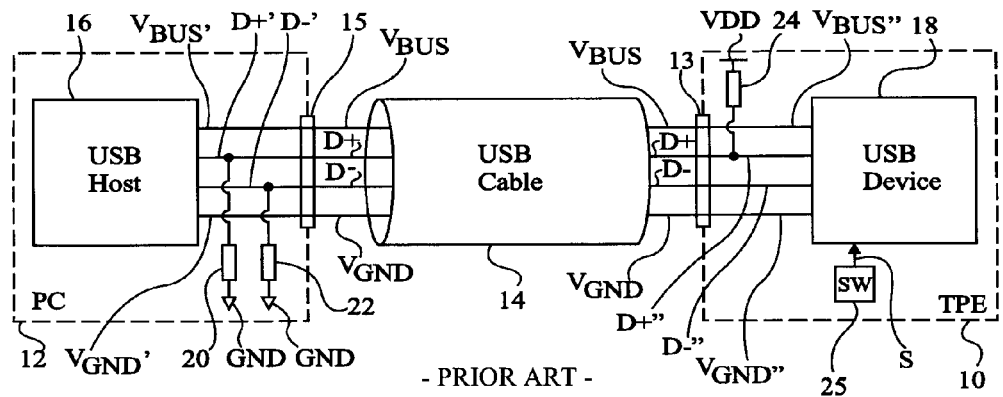
Fig 1 - PRIOR ART -
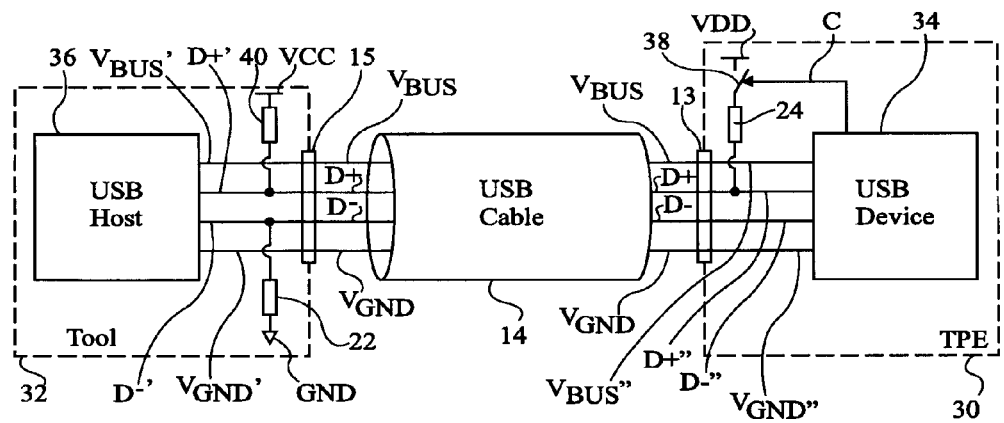
Fig 2
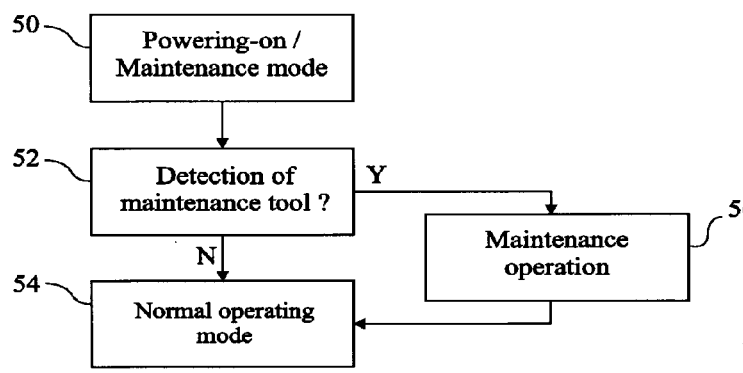
Fig 3

DATA EXCHANGE BETWEEN AN ELECTRONIC PAYMENT TERMINAL AND A MAINTENANCE TOOL THROUGH A USB LINK

FIELD OF THE INVENTION

The present invention relates to the data exchange between an electronic payment terminal and a maintenance tool via a USB (Universal Serial Bus) connection.

DISCUSSION OF PRIOR ART

More and more electronic payment terminals can exchange data with an external system, for example, a computer, via a USB connection. As an example, an electronic payment terminal may be connected to a computer via a USB connection so that the terminal transmits data, for example associated with the payment operations performed by the terminal, to the computer.

It is desirable to be able to use the USB connection of the electronic payment terminal to perform maintenance operations. A maintenance operation comprises, for example, loading software into a memory of the payment terminal, updating software already stored in the payment terminal, etc.

The security level generally required in the field of payment operations imposes the impossibility for a maintenance operation to be performed during the normal operation of the electronic payment terminal. For this purpose, a conventional solution comprises providing, at the terminal level, a selection switch enabling switching from a normal operating mode in which a maintenance operation is forbidden to a maintenance mode in which a maintenance operation can be performed. Thereby, if a computer connected to the payment terminal attempts to perform a maintenance operation while the terminal is in the normal operating mode, the terminal will refuse to exchange data with the computer.

However, the security level provided by such a solution may be insufficient. Indeed, the selection switch may be fraudulently actuated to select the maintenance mode. The electronic payment terminal may then be connected to a conventional computer by the USB connection to perform a fraudulent operation in the maintenance mode.

SUMMARY OF THE INVENTION

An aspect of the present invention aims at an electronic payment terminal capable of preventing a data exchange with a conventional computer over a USB connection in a maintenance mode.

According to another object, the electronic payment terminal is capable of performing at least partly automatically the switching between the normal operating mode and the maintenance mode.

Another aspect aims at a maintenance system which, when the electronic payment terminal is in the maintenance mode, is capable of exchanging data with the terminal over the USB connection.

Another aspect aims at a method for exchanging data between the electronic payment terminal and the maintenance system over the USB connection.

For this purpose, it provides an electronic payment terminal comprising a first USB connection terminal comprising at least one first data transfer wire. The payment terminal further comprises a first resistor connecting the first wire to a first source of a first voltage and a switch between the first wire and the first resistor or between the first resistor and the first source.

According to an embodiment, the terminal comprises a control circuit capable of turning on the switch in a first operating mode and of turning off the switch in a second operating mode. The terminal is intended to be connected, by the first USB connection terminal, to a first system in the first operating mode and to a second system in the second operating mode. The first and second systems are capable of initiating a data exchange with the terminal. The first system comprises a second wire intended to be connected to the first wire and a second resistor connecting the second wire to a second source of a second voltage strictly smaller than the first voltage. The second system comprises a third wire intended to be connected to the first wire and a third resistor connecting the third wire to a third source of a third voltage strictly greater than the second voltage.

The present invention also provides a system comprising at least one second USB connection terminal comprising at least one fourth data transfer wire. The system comprises a circuit capable of repeatedly transmitting, over the second USB connection terminal, an identification request to start a data exchange by the second connection terminal as long as a response signal has not been received from the second connection terminal.

According to an embodiment, the system is intended to be connected to a terminal such as defined previously.

According to an embodiment, the system comprises a fourth source of a fourth voltage, a fifth source of a fifth voltage strictly greater than the fourth voltage and a fourth resistor connecting the fourth wire to the fifth source.

The present invention also provides a method for exchanging data between an electronic payment terminal and a first system or a second system. The terminal comprises a USB connection terminal comprising at least one first data transfer wire. The terminal further comprises a first resistor connecting the first wire to a first source of a first voltage, and a switch between the first wire and the first resistor or between the first resistor and the first source. The first and second systems are capable of initiating a data exchange with the terminal. The first system comprises a second wire intended to be connected to the first wire and a second resistor connecting the second wire to a second source of a second voltage strictly smaller than the first voltage. The second system comprises a third wire intended to be connected to the first wire and a third resistor connecting the third wire to a third source of a third voltage strictly greater than the second voltage. The method comprises the steps of having the terminal turn off the switch to allow for a data exchange between the terminal and the second system; and having the terminal turn on the switch to allow for a data exchange between the terminal and the first system.

According to an embodiment, the method comprises having the terminal, when the terminal is powered on, turn off the switch for a given time period and then turn on the switch if during said time period, a data exchange has not occurred between the terminal and the second system.

According to an embodiment, the method comprises having the terminal not respond to requests issued by the second system when the switch is on.

According to an embodiment, the method comprises having the second system repeatedly transmit, at least partly over the third wire, an identification request to start a data exchange with the terminal as long as the second system receives no response from the terminal.

BRIEF DESCRIPTION OF THE DRAWINGS

The foregoing and other objects, features, and advantages of the present invention will be discussed in detail in the following non-limiting description of a specific example in connection with the accompanying drawings, among which:

FIG. 1 schematically shows a conventional example of a connection between an electronic payment terminal and a computer over a USB cable;

FIG. 2 schematically shows an example of a connection according to the present invention between an electronic payment terminal and a maintenance tool over a USB cable; and FIG. 3 shows, in the form of a block diagram, an example of an operating process of the terminal.

DETAILED DESCRIPTION

For clarity, the same elements have been designated with the same reference numerals in the different drawings. Only those elements necessary to the understanding of the present invention are shown in the drawings and will be described hereafter.

FIG. 1 conventionally shows an electronic payment terminal 10 (TPE) connected to a computer 12 (PC). Terminal 10 comprises a USB connection terminal 13 in which is connected one end of a USB cable 14. Computer 12 comprises a USB connection terminal 15 receiving the opposite end of USB cable 14. Conventionally, electronic payment terminal 10 enables performing payment operations, for example, via a smart card, a magnetic card, a check, etc.

As described in USB standard 2.0, USB cable 14 comprises four conductive wires or conductive lines. Conductive wire $V_{BUS}$ is used for the transmission of a high reference voltage, generally of a few volts. Conductive wire $V_{GND}$ is used for the transmission of a low reference voltage, generally the ground of computer 12. Conductive wires D+ and D− are used for the transmission of the useful signal. Computer 12 comprises a communication unit 16 (USB Host), which will be called host unit 16 in the following description. Connection terminal 15 comprises four wires $V_{BUS}'$, D+', D−', and $V_{GND}'$ which respectively prolong wires $V_{BUS}$, D+, D−, and $V_{GND}$ down to host unit 16. Terminal 10 comprises a communication unit 18 (USB device), which will be called peripheral unit in the following description. Connection terminal 13 comprises four wires $V_{BUS}''$, D+'', D−'', and $V_{GND}''$ which respectively prolong wires $V_{BUS}$, D+, D−, and $V_{GND}$ down to peripheral unit 18. Units 16 and 18 are capable of exchanging data via USB cable 14, for example, according to the data exchange protocol described in USB standard 2.0. In particular, the data exchange is initiated by host unit 16.

Conventionally, resistors 20, 22 (generally called pull-down resistors) connecting wires D+' and D−' to ground GND are provided at the level of computer 12. On the side of terminal 10 and, generally, on the side of any peripheral device capable of being connected to a computer by a USB connection, a resistor 24 (generally called pull-up resistor) which connects wire D+'' (or, as a variation, wire D−'') to a source VDD of a high voltage generally of a few volts, is provided. Pull-up resistance 24 is smaller, generally by one order of magnitude, than pull-down resistances 20, 22. Source VDD may correspond to wire $V_{BUS}''$.

When terminal 10 is not connected to computer 12, wires D+, D+', D−, and D−' are substantially maintained at the potential of ground GND via resistors 20, 22 on the side of computer 12. When terminal 10 is connected to computer 12 by USB cable 14, host unit 16 detects the presence of terminal 10 by the elevation of the voltage of wires D+', D+, D+'' due to resistor 24 on the side of terminal 10, which connects wire D+'' to source VDD. Host unit 16 then initiates a data exchange with terminal 10, generally by the sending of an identification request to terminal 10 to obtain the operating parameters of the terminal (for example, request Getdescriptor defined by USB standard 2.0). In the absence of a response from terminal 10, host unit 16 transmits twice again the identification request. If terminal 10 still does not answer, host unit 16 considers that peripheral unit 18 is out of order and the communication is interrupted.

Terminal 10 comprises a selection unit 25 (SW) capable of providing an operating mode selection signal S to peripheral unit 18. Selection unit 25 may be a mechanical switch. According to the value of signal S transmitted by selection unit 25, peripheral unit 18 operates in a normal operating mode or in a maintenance mode. In each of these modes, peripheral unit 18 is capable of exchanging data over USB connection 14 according to a specific protocol and especially expects to receive requests of a specific type.

To avoid the possibility for a maintenance operation to be performed by a conventional computer to allow for the switching between the normal operating mode and the maintenance mode to be at least partly automatically performed by the terminal, it is provided to modify the structure of the terminal so that a maintenance operation can only be performed by a specific maintenance tool having a structure different from that of a conventional computer. Further, the exchange protocol between the maintenance tool and the terminal is modified with respect to the conventional exchange protocol described in USB standard 2.0.

More specifically, in the maintenance mode, the terminal is provided to be capable of temporarily "removing" the pull-up resistor to avoid elevating the voltage of wires D+', D+, D+'' when the terminal is connected to the maintenance tool (or to a computer) by a USB connection. Further, the maintenance tool is provided to permanently send an identification request until it receives a response from the terminal. Thereby, the terminal detects the presence of the maintenance tool by the reception of an identification request, rather than having the maintenance tool detect the presence of the terminal by an elevation of the voltage of wires D+', D+, D+''. In normal operating mode, the terminal is capable of "placing back" the pull-up resistor to enable a conventional data exchange according to the conventional USB standard.

FIG. 2 shows an embodiment of electronic payment terminal 30 (TPE) and of maintenance tool 32 (Tool). The elements common with terminal 10 and computer 12 shown in FIG. 1 are designated with the same reference numerals. Terminal 30 comprises a communication unit 34 (USB Device), called peripheral unit, operating similarly to unit 18 except for certain points which will be described hereafter. Similarly, maintenance tool 32 (Tool) comprises a communication unit 36 (USB Host), called host unit, operating similarly to unit 16 except that the communication protocol implemented by unit 36 differs by certain points from the conventional communication protocol implemented by unit 16.

Terminal 30 comprises a switch 38 arranged, for example, between resistor 24 and the source of reference voltage VDD. Switch 38 is controlled by a signal C, provided by peripheral unit 34. Maintenance tool 32 comprises a resistor 40 of pull-up type connecting wire D+' to a source of a high reference voltage VCC. Source VCC may correspond to wire $V_{BUS}'$. Tool 32 further comprises pull-down resistor 22 connecting wire D−' to ground GND, resistor 20 connecting wire D+' to ground being absent. Resistors 40, 22 ensure a proper biasing of wires D+' and D−' to enable transmission of data over USB connection 14.

In the normal operating mode, peripheral unit 34 controls the turning-on of switch 38 so that terminal 30 can operate similarly to terminal 10 shown in FIG. 1. In particular, terminal 30 can then be conventionally connected to a computer by USB connection 14.

In the maintenance mode, peripheral unit 34 controls the turning-off of switch 38. In this case, if terminal 30 is connected to a conventional computer, such as computer 12 of FIG. 1, computer 12 cannot detect the presence of terminal 30 since wires D+' and D−' remain grounded. No data exchange can then occur.

FIG. 3 illustrates the steps of an example of an operating process of terminal 30.

At step 50, terminal 30 is powered on. Peripheral unit 34 controls the turning-off of switch 38. Terminal 30 is then in the maintenance mode. The method carries on at step 52.

At step 52, terminal 30 waits for the reception of a request from maintenance tool 32. If, at the end of a determined time period, no data exchange occurs between terminal 30 and maintenance tool 32, the method carries on at step 54.

At step 54, peripheral unit 34 controls the turning-on of switch 38. Terminal 30 then is in the normal operating mode. Once terminal 30 is in the normal operating mode, it is necessary, to perform a maintenance operation, to power off and back on terminal 30.

At step 52, if terminal 30 receives a request from maintenance tool 32, the method carries on at step 56.

At step 56, a maintenance operation takes place. When it is completed, the method carries on at step 54 where terminal 30 switches to the normal operating mode.

At step 52, when terminal 30 is connected to maintenance tool 32 by USB connection 14, maintenance tool 32 is not able to detect the presence of terminal 30 since wire D+' is at a high voltage via pull-up resistor 40 independently from the presence or the absence of terminal 30. Thereby, if the conventional USB data exchange protocol was used, host unit 36 would believe to have detected the presence of terminal 30 as soon as it is powered on and would immediately transmit the identification request three times and, due to the fact that it would be very unlikely for terminal 30 to be present at this time, host unit 36 would prevent any subsequent data exchange. To be able to perform a data exchange, it is necessary to modify the initial steps of the USB protocol implemented by host unit 36. For this purpose, host unit 36 is provided to uninterruptedly transmit an identification request until it receives a response from terminal 30. Thereby, when terminal 30 is in the maintenance mode, peripheral unit 34 detects the presence of maintenance tool 30 by the reception of an identification request transmitted by wires D+ and D−. Peripheral unit 34 can then respond to host unit 36 and the data exchange may carry on conventionally at step 56. If terminal 30 is in the normal operating mode, it is sufficient for it not to respond to the identification request of host unit 36 to prevent a maintenance operation from occurring.

According to a variation, maintenance tool 32 may be autonomous or itself connected to a computer.

Specific embodiments of the present invention have been described. Various alterations and modifications will occur to those skilled in the art. In particular, although the present invention has been described for the maintenance of an electronic payment terminal, it should be clear that the present invention may apply to any type of operations performed with an electronic payment terminal for which the use of a specific tool is desired to be imposed rather than that of a conventional computer. Such is the case, for example, for a diagnosis operation.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for exchanging data between an electronic payment terminal and a first system or a second system, the terminal comprising a USB connection terminal comprising at least one first data transfer wire, a first resistor connecting the first wire to a first source of a first voltage, and a switch between the first wire and the first resistor or between the first resistor and the first source, the first system comprising a first communication unit, a second wire connected to the first communication unit and intended to be connected to the first wire and a second resistor connecting the second wire to a second source of a second voltage strictly smaller than the first voltage and the second system comprising a second communication unit and a third wire connected to the second communication unit and intended to be connected to the first wire and a third resistor connecting the third wire to a third source of a third voltage strictly greater than the second voltage, the first and second communication units being adapted to initiate a data exchange with the electronic payment terminal, the method comprising the steps of:
   having the electronic payment terminal turn off the switch to allow for a data exchange between the electronic payment terminal and the second system; and
   having the electronic payment terminal turn on the switch to allow for a data exchange between the electronic payment terminal and the first system.

2. The method of claim 1, comprising having the electronic payment terminal, when the electronic payment terminal is powered on, turn off the switch for a given time period and then turn on the switch if, during said time period, a data exchange has not occurred between the electronic payment terminal and the second system.

3. The method of claim 1, comprising having the electronic payment terminal not respond to requests issued by the second system when the switch is on.

4. The method of claim 1, comprising having the second system repeatedly transmit, at least partly over the third wire, an identification request to start a data exchange with the electronic payment terminal as long as the second system receives no response from the electronic payment terminal.

5. A device comprising a first system, a second system and an electronic payment terminal, the electronic payment terminal comprising:
   a first USB connection terminal comprising at least one first data transfer wire;
   a first resistor connecting the first wire to a first source of a first voltage;
   a switch between the first wire and the first resistor or between the first resistor and the first source; and
   a control circuit capable of turning on the switch in a first operating mode and of turning off the switch in a second operating mode, the electronic payment terminal being adapted to be connected, by the first USB connection terminal, to the first system in the first operating mode and to the second system in the second operating mode, the first system comprising a first communication unit, a second wire connected to the first communication unit and adapted to be connected to the first wire and a second resistor connecting the second wire to a second source of a second voltage strictly smaller than the first voltage and the second system comprising a second communication unit, a third wire connected to the second communication unit and adapted to be connected to the first wire and a third resistor connecting the third wire to a third source of a third voltage strictly greater than the second voltage, the first and second communication units being capable of initiating a data exchange with the electronic payment terminal.

6. The device of claim 5, wherein the second system comprises at least one fourth USB connection terminal comprising at least one fourth data transfer wire, comprising a circuit capable of repeatedly transmitting, over the second USB connection terminal, an identification request to start a data exchange by the second USB connection terminal as long as a response signal has not been received from the second USB connection terminal.

7. The device of claim 6, wherein the second system comprises a fourth source of a fourth voltage, a fifth source of a fifth voltage strictly greater than the fourth voltage and a fourth resistor connecting the fourth wire to the fifth source.

* * * * *